United States Patent
Blacket et al.

(10) Patent No.: US 10,751,790 B2
(45) Date of Patent: Aug. 25, 2020

(54) LINEAR ACTUATOR ASSEMBLY

(71) Applicant: Henrob Limited, Flintshire (GB)

(72) Inventors: Stuart Edmund Blacket, Queensland (AU); Wojciech Gostylla, Queensland (AU); Nicholas Richard Clew, Farmington Hills, MI (US)

(73) Assignee: ATLAS COPCO IAS UK LIMITED, Flintshire (GB)

( * ) Notice: Subject to any disclaimer, the term of this patent is extended or adjusted under 35 U.S.C. 154(b) by 833 days.

(21) Appl. No.: 15/110,919

(22) PCT Filed: Jan. 16, 2015

(86) PCT No.: PCT/GB2015/050085
§ 371 (c)(1),
(2) Date: Jul. 11, 2016

(87) PCT Pub. No.: WO2015/107353
PCT Pub. Date: Jul. 23, 2015

(65) Prior Publication Data
US 2016/0339506 A1    Nov. 24, 2016

(30) Foreign Application Priority Data

Jan. 16, 2014  (GB) .................................. 1400725.6
Jan. 16, 2014  (GB) .................................. 1400734.8
(Continued)

(51) Int. Cl.
*B21J 15/26*    (2006.01)
*B21J 15/10*    (2006.01)

(52) U.S. Cl.
CPC ................ *B21J 15/26* (2013.01); *B21J 15/10* (2013.01)

(58) Field of Classification Search
CPC ........... B21J 15/26; B21J 15/025; B21J 15/10
See application file for complete search history.

(56) References Cited

U.S. PATENT DOCUMENTS

| 1,404,126 A | 1/1922 | Krause |
| 2,743,623 A | 5/1956 | Wells |

(Continued)

FOREIGN PATENT DOCUMENTS

| CN | 1 078 672 A | 11/1993 |
| CN | 1232736 A | 10/1999 |

(Continued)

OTHER PUBLICATIONS

Tech Center 3600 Search Report (Year: 2019).*
(Continued)

*Primary Examiner* — Bobby Rushing, Jr.
(74) *Attorney, Agent, or Firm* — McCracken & Gillen LLC

(57) ABSTRACT

A linear actuator assembly comprises a housing, an output shaft, a nose piece and a negative pressure device. The output shaft defines an actuator assembly axis, and is movable along the actuator assembly axis between an extended position and a retracted position relative to the housing. The nose piece is slidably mounted to the output shaft and movable between an extended position and a retracted position relative to the output shaft. The nose piece and the output shaft co-operatively define a chamber for containing a quantity of fluid, the volume of the chamber being smaller when the nose piece is in the retracted position than when the nose piece is in the extended position. The negative pressure device is connectable to the chamber, and is selectively operable so as to reduce the pressure in the sealed volume, thereby urging the nose piece from the extended position towards the retracted position.

14 Claims, 10 Drawing Sheets

(30) Foreign Application Priority Data

Jan. 16, 2014 (GB) .................................. 1400736.3
Jan. 16, 2014 (GB) .................................. 1400761.1

(56) References Cited

U.S. PATENT DOCUMENTS

| | | | |
|---|---|---|---|
| 3,127,044 | A | 3/1964 | Brown |
| 4,756,072 | A | 7/1988 | Falzoni |
| 5,183,357 | A | 2/1993 | Palm |
| 5,256,017 | A | 10/1993 | Smornov et al. |
| 5,315,744 | A * | 5/1994 | Denham .................. B21J 15/04 29/243.523 |
| 6,234,034 | B1 | 5/2001 | Ando |
| 6,676,000 | B2 * | 1/2004 | Lang ..................... B21J 15/025 227/152 |
| 7,032,296 | B2 * | 4/2006 | Zdravkovic ............ B21J 15/025 29/243.53 |
| 7,559,133 | B2 * | 7/2009 | Chitty .................... B21J 15/025 227/2 |
| 7,908,727 | B2 * | 3/2011 | Clew ..................... B21J 15/025 29/407.02 |
| 2002/0125297 | A1 | 9/2002 | Stol et al. |
| 2002/0166221 | A1 | 11/2002 | Clew |
| 2003/0029903 | A1 | 2/2003 | Kashiki et al. |
| 2003/0051332 | A1 | 3/2003 | Meichsner et al. |
| 2004/0118900 | A1 | 6/2004 | Stevenson et al. |
| 2008/0056842 | A1 | 3/2008 | Stevenson et al. |
| 2008/0093420 | A1 | 4/2008 | Maurer |
| 2008/0276444 | A1 | 11/2008 | Condliff |
| 2008/0289442 | A1 * | 11/2008 | Kawada .................. F16H 25/20 74/473.12 |
| 2009/0247365 | A1 * | 10/2009 | Di Stefano ............. B60T 13/02 477/197 |
| 2011/0164945 | A1 | 7/2011 | Lathabai et al. |
| 2011/0304231 | A1 | 12/2011 | Wu |
| 2014/0041193 | A1 * | 2/2014 | Schlafhauser ......... B21J 15/025 29/432 |
| 2014/0245848 | A1 * | 9/2014 | Ikeda .................. F16H 25/2204 74/89.44 |
| 2014/0265547 | A1 * | 9/2014 | Ganzel .................. B60T 13/168 303/66 |
| 2014/0298934 | A1 * | 10/2014 | Marek ..................... B21J 15/04 29/243.523 |

FOREIGN PATENT DOCUMENTS

| | | | |
|---|---|---|---|
| CN | 101433935 | | 5/2009 |
| CN | 201246383 Y | | 5/2009 |
| CN | 101451599 A | | 6/2009 |
| CN | 101468421 A | | 7/2009 |
| CN | 101537252 A | | 9/2009 |
| CN | 101817142 A | | 9/2010 |
| CN | 102 686 329 A | | 9/2012 |
| CN | 202481711 U | | 10/2012 |
| CN | 103228375 A | | 7/2013 |
| CN | 103 260 790 A | | 8/2013 |
| CN | 103240564 A | | 8/2013 |
| CN | 203253869 U | | 10/2013 |
| CN | 103990756 A | | 8/2014 |
| CN | 204220914 | * | 3/2015 ............ B21J 15/32 |
| CN | 101829903 A | | 9/2019 |
| DE | 19743277 A1 | | 5/1999 |
| DE | 10 2004 015 568 A1 | | 10/2005 |
| DE | 102004053224 A1 | * | 5/2006 ............ B21J 15/025 |
| DE | 102010046318 A1 | | 3/2012 |
| FR | 993420 A | | 10/1951 |
| JP | S59 4981 A | | 1/1984 |
| JP | H 01254342 A | | 10/1989 |
| JP | H02229639 A | | 9/1990 |
| JP | 2002-174219 | | 6/2002 |
| JP | 2002/174219 A | | 6/2002 |
| JP | 3349098 | | 11/2002 |
| JP | 2002-364617 | | 12/2002 |
| JP | 2005291382 A | | 10/2005 |
| JP | 2006/043769 A | | 2/2006 |
| JP | 2007/520358 A | | 7/2007 |
| JP | 4 517 362 B2 | | 8/2010 |
| JP | 5055104 | | 10/2012 |
| JP | 2013148122 | | 8/2013 |
| KR | 10 1995 7002 507 A | | 11/1995 |
| KR | 10-2004-0090612 | | 10/2004 |
| KR | 1020040090612 A | | 10/2004 |
| KR | 10-2011-0036624 | | 4/2011 |
| KR | 10-2011-0131826 | | 12/2011 |
| KR | 10-2013-0070362 | | 6/2013 |
| KR | 10-2013-0134180 | | 12/2013 |
| KR | 10-2013-0140711 | | 12/2013 |
| WO | WO 94/14554 | | 7/1994 |
| WO | WO 94/14554 A1 | | 7/1994 |
| WO | WO 2009/137868 | | 11/2009 |

OTHER PUBLICATIONS

Japanese Office action (with English Summary) dated Dec. 4, 2018, for Japanese application JP 2016-564426, Applicant, Henrob Limited (8 pages).

Japanese Office action (English Summary) dated Nov. 13, 2018, for Japanese Patent Application No. JP 2016-564424: Applicant, Henrob Limited (8 pages).

Japanese Office action (English Summary) dated Jan. 15, 2019, for Japanese Patent Application No. JP 2016-564423: Applicant, Henrob Limited (5 pages).

Chinese First Office Action with English Summary dated Apr. 3, 2018, for Chinese Patent Application No. 2015800047956, Applicant, Henrob Limited (8 pages).

Lathabai, S., Friction spot joining of an extruded Al—Mg—Si alloy, Science Direct (online), Aug. 22, 2006, pp. 899-902, Scripta Materialia 55 (2006) (4 Pages).

International Search Report and Written Opinion dated Apr. 20, 2015, for International Application No. PCT/GB2015/050084, Applicant, Henrob Limited (11 Pages).

Invitation to Pay Additional Fees dated Apr. 8, 2015, for International Application No. PCT/GB2015/050085, Applicant, Henrob Limited (6 Pages).

International Search Report dated Jun. 9, 2015, for International Application No. PCT/GB2015/050085, Applicant, Henrob Limited (4 Pages).

Chinese Second Office action with English Summary dated Aug. 31, 2018, for Chinese Patent Application No. 201580013385.8, Applicant, Henrob Limited (26 pages).

Japanese Office action English Summary dated Oct. 2, 2018, for Japanese Patent Application No. JP 2016-564425, Applicant, Henrob Limited (1 page).

First Office Action dated Sep. 29, 2017, for Chinese Appl. No. 201580004824.9, and English Translation (8 pages).

First Office Action dated Oct. 30, 2017, for Chinese Appl. No. 201580013385.8, and English Summary (21 pages).

First Office Action dated Dec. 4, 2017, for Chinese Appl. No. 2015800049330, and English summary (7 pages).

English Translation of Korean Notice of Office Action transmitted Jul. 10, 2017, for KR Application No. 10-2016-7021078, Applicant Henrob Ltd. (5 pages).

English Translation of Korean Notice of Office Action transmitted Jul. 18, 2017, for KR Application No. 10-2016-7021130, Applicant Henrob Ltd. (3 pages).

English Translation of Korean Notice of Office Action transmitted Jul. 18, 2017, for KR Application No. 10-2016-7021353, Applicant Henrob Ltd. (15 pages).

Chinese second office action (with English Translation) dated Feb. 19, 2019, for Chinese application CN201580004795.6, applicant, Henrob Limited (10 pages).

International Search Report (with English summary) dated Jun. 13, 2005, accompanying JP2007/520358A, applicant, Newfrey LLC (6 pages).

Communication related to European Patent Application No. 15701570.2, dated Sep. 9, 2019, Applicant, Atlas Copco IAS UK Limited (9 pages)).

(56) References Cited

OTHER PUBLICATIONS

U.S. Patent and Trademark Office Non-final Office action, U.S Appl. No. 15/110,913, dated Apr. 24, 2019 (21 pages).
Third Office Action issued in connection with Chinese Application No. 201580013385.8, dated Dec. 3, 2019, and summarized translation (27 pages).

* cited by examiner

LINEAR ACTUATOR ASSEMBLY

The present invention relates to a linear actuator assembly.

Self-piercing riveting (SPR) is a spot-joining technique in which a self-piercing rivet is driven, by a punch, into a layered workpiece supported on a die. The die is shaped so that as the rivet is driven into the workpiece towards the die, the material of the workpiece plastically deforms. This flow of workpiece material causes the annular tip of the rivet to flare outwards and remain encapsulated by an upset annulus of the workpiece material. The flared tip of the rivet interlocking with the upset annulus of the workpiece prevents removal of the rivet or separation of the layers of the workpiece.

Insertion of the rivet into the workpiece is performed using a linear actuator, which drives the punch and rivet towards a stationary workpiece and die, or drives the die and workpiece towards a stationary rivet and punch (the former arrangement being more common). Linear actuators of many different types may be used for SPR, but the most common types are hydraulic cylinders, or motor-driven actuators (more specifically motor-driven electrical actuators). Motor-driven electrical actuators, unlike electrical actuators such as solenoids, utilise a conventional rotary electric motor. The motor operates a ball screw, lead screw or roller screw mechanism so as to produce linear movement of an output shaft. These three mechanisms all follow the same basic format—the motor rotates a first threaded member which is meshed (directly or indirectly) with a second threaded member which is part of the output shaft. If the first and second threaded members rotate in unison, no linear motion is produced. If the first threaded member rotates relative to the second, however, (for instance if the second threaded member is prevented from rotating), rotation of the first threaded member will be translated into linear motion of the second threaded member.

As an example, a lead screw mechanism comprises an internally-threaded nut meshed directly with an externally-threaded screw shaft. If the screw shaft is connected to a motor and the nut to an output shaft, the screw shaft constitutes the first threaded member and the nut the second threaded member. By rotating the screw shaft using the motor, the nut moves along the screw shaft and the output shaft moves linearly. The above also holds in relation to ball screw mechanisms, except that the nut and screw shaft are not meshed directly. Instead, they are meshed indirectly via a set of ball bearings disposed therebetween. Similarly, roller screw mechanisms follow the above principle but the screw shaft and nut are meshed indirectly through a set of threaded rollers.

Although mechanisms utilising first and second threaded members for translating rotary motion into linear motion exist where the threaded members are disposed side-by-side, in conventional actuators (especially for high-force applications such as SPR) the first and second threaded members are concentrically arranged. More particularly, the first threaded member (connected to the motor) is externally threaded and the second threaded member (part of the output shaft) is internally threaded, the first threaded member being received within the second threaded member. In simple terms, the first threaded member takes the form of a bolt and the second threaded member takes the form of a nut. For the sake of compactness the space within the second threaded member, within which the first threaded member can be received, extends beyond the second threaded member and into the main body of the output shaft (the portion of the output shaft not made up of the second threaded member) to allow the two components to be more fully nested. One problem with this arrangement is that with the output shaft being tubular so as to accommodate the first threaded member, when the actuator forms part of an actuator assembly for a particular application peripheral components required by that application (such as stripper springs and clamping springs for SPR, as discussed below) must be mounted externally to the output shaft. This increases the dimensions of the actuator assembly as a whole.

As described above, for a motor-driven actuator to function, the first threaded member must rotate relative to the second threaded member. In other words, rotation of the second threaded member must be restricted. Conventionally, this is done by fixing a support tube to the front of a housing of the actuator, within which the output shaft can move. The output shaft is provided with keys, received within keyways in the support tube, which prevent the output shaft (and thus the second threaded member) from rotating. However, the keyways, and thus the support tube, must be at least as long as the stroke length of the actuator so that the keys of the output shaft remain accommodated therein. This increases the overall length of the assembly, making it more unwieldy.

In spot-joining operations such as SPR, the actuator assembly utilised must incorporate a mechanism for feeding fasteners (such as self-piercing rivets) to the punch. Conventionally this is achieved via a nose piece which is movable both relative to the housing and the output shaft. The nose piece is held in an extended position, in which it projects further than the tip of the punch, by a stripper spring. A rivet feed mechanism is mounted to or comprised by the nose piece. When the output shaft of the actuator is advanced forwards (i.e. extended towards the workpiece) to drive a rivet, the nose piece (or a component attached thereto) contacts the workpiece first. Further extension of the output shaft towards the workpiece causes the output shaft to move forwards relative to the nose piece, i.e. causes the nose piece to move backwards relative to the output shaft, compressing the stripper spring. After rivet insertion has taken place, as the output shaft starts to retract the nose piece continues to be forced forwards by the stripper spring. The nose piece thus moves forwards again relative to the output shaft. This reciprocating movement of the nose piece is used to operate a rivet feed mechanism, advancing the next rivet into position in front of the punch.

In some spot-joining applications such as SPR, the quality of the joint can be improved by clamping the workpiece during rivet insertion. This is conventionally achieved using an annular clamp surface provided on the nose piece or mounted thereto. A clamping spring is positioned so that when the nose piece approaches its rearmost position relative to the output shaft, the clamping spring imparts an additional force to the nose piece, urging it forwards (thereby urging the clamp surface against the workpiece) with increased force. This increased force is maintained as the output shaft completes its forward movement, thereby clamping the workpiece as the rivet is inserted.

Since the nose piece is urged forwards by the stripper spring and clamping spring, when no force is applied to it, it projects forwards to the maximum extent possible. This increases the overall length of the actuator assembly. If the actuator assembly is mounted on a force reaction frame, for instance opposite a die, this results in less clearance between the die and the tip of the nose piece when the output shaft is retracted. This, in turn, limits the size of the workpiece which can be inserted into the gap. Where a workpiece is too large to fit into this gap, the only option is to utilise an actuator with increased stroke length (which can thus move across a larger gap to the die). This increases the overall size and weight of the actuator assembly required.

It is one object of the present invention to mitigate or obviate one of the aforesaid disadvantages, and/or to provide an improved or alternative linear actuator assembly.

According to a first aspect of the present invention there is provided a linear actuator assembly comprising:
 a housing;
 an output shaft which defines an actuator assembly axis, the output shaft being movable along the actuator assembly axis between an extended position and a retracted position relative to the housing;
 a nose piece which is slidably mounted to the output shaft and movable between an extended position and a retracted position relative to the output shaft; and
 a negative pressure device,
 wherein:
 the nose piece and the output shaft co-operatively define a chamber for containing a quantity of fluid, the volume of the chamber being smaller when the nose piece is in the retracted position than when the nose piece is in the extended position;
 the negative pressure device is connectable to the chamber; and
 the negative pressure device is selectively operable so as to reduce the pressure in the sealed volume, thereby urging the nose piece from the extended position towards the retracted position.

Where the actuator assembly is mounted to a force reaction frame opposite a die (for example), the nose piece being movable towards the retracted position by the negative pressure device may allow the gap between the nose piece and the die to be increased. This, in turn, may allow larger workpieces to be inserted into the force reaction frame than would be possible for conventional actuators of the same stroke length. The compactness that may be offered by the ability to selectively reduce the axial length of the actuator assembly in this way may also be of benefit in other situations, such as those in which a force reaction frame is not used.

In an arrangement according to the first aspect of the invention:
 the nose piece and the output shaft may also co-operatively define an additional chamber for containing a quantity of fluid, the volume of this additional chamber being larger when the nose piece is in the retracted position than when the nose piece is in the extended position; and
 the additional chamber may be connectable to a source of pressurised fluid, and is arranged whereby introduction of fluid from said source increases the volume of the chamber, thereby urging the nose piece from the extended position towards the retracted position.

The negative pressure device may be connectable to said chamber through the nose piece.

The negative pressure device being connectable to the chamber through the nose piece may be beneficial in that the nose piece may be more accessible, thereby placing fewer design constraints on the assembly as a whole.

As an alternative, the negative pressure device may be connected to the chamber through the output shaft, or at a junction between the portions thereof defined by the nose piece and the output shaft.

The negative pressure device may comprise a tank of low-pressure gas, in which case operation of the negative pressure device may include opening a valve between the tank and the chamber. As an alternative, the negative pressure device may comprise a pump such as a lobe pump, screw pump, piston pump or injector-jet pump (such as a Venturi pump), in which case operation of the negative pressure device may include activating the pump.

Operation of the negative pressure device may urge the nose piece to the retracted position, or to an intermediate position between the extended position and the retracted position.

According to a second aspect of the present invention there is provided a linear actuator assembly comprising:
 a housing;
 an output shaft which defines an actuator assembly axis, the output shaft being movable along the actuator assembly axis between an extended position and a retracted position relative to the housing; and
 a nose piece which is slidably mounted to the output shaft and movable between an extended position and a retracted position relative to the output shaft,
 wherein:
 the nose piece and the output shaft co-operatively define a chamber for containing a quantity of fluid, the volume of the chamber being larger when the nose piece is in the retracted position than when the nose piece is in the extended position; and
 the chamber is connectable to a source of pressurised fluid, and is arranged whereby introduction of fluid from said source increases the volume of the chamber, thereby urging the nose piece from the extended position towards the retracted position.

Where the actuator assembly is mounted to a force reaction frame opposite a die, for example, the nose piece being movable towards the retracted position by increasing the volume of the chamber (by supplying fluid from the source of pressurised fluid) may allow the gap between the nose piece and the die to be increased. As with the first aspect of the invention, this may allow larger workpieces to be inserted into the force reaction frame than would be possible for conventional actuators of the same stroke length. Again, the compactness that may be offered by the ability to selectively reduce the axial length of the actuator assembly in this way may also be of benefit in other situations, such as those in which a force reaction frame is not used.

In the second aspect of the invention, or where the first aspect of the invention comprises said additional chamber, the source of pressurised fluid may be a tank of compressed gas, a pump (such as any of the examples given above), or any other suitable means.

In any aspect of the invention, the nose piece may be a single component, or a multi-part assembly. It may comprise or be connected to a fastener feed mechanism and/or a workpiece clamping surface.

The or at least one of the chambers may contain any suitable fluid, for instance a gas (or mixture of gasses) such as nitrogen or air, or a liquid (or mixture of liquids) such as oil or water.

The or each chamber may take any suitable form, for instance cylindrical, prismic, annular and/or segmented in shape.

The or at least one of the chambers may be arranged to be selectively sealed, thereby allowing the nose piece and output shaft to co-operatively form a gas spring mechanism. This gas spring may be configured to work in tension, and/or in compression. If the gas spring is configured to work in compression, the chamber in question must contain a quantity of gas, rather than containing only liquid or containing nothing (for instance having zero volume when unloaded, or containing a vacuum).

The nose piece and output shaft forming a gas spring mechanism may be beneficial in providing resilient bias between the nose piece and output shaft. For instance, the gas spring mechanism may be used in place of a stripper spring and/or clamping spring where the actuator assembly is used in spot-joining applications.

Alternatively, the or each chamber may remain unsealed. For instance, in the first aspect of the invention, where the negative pressure device is an ejector jet pump the chamber connected thereto may be in continuous fluid communication with the pump. In this case, the pressure in that chamber would equalise with ambient pressure when the pump was not in operation, and would be reduced below ambient pressure when the pump was in operation.

The nose piece may comprise a cavity which defines part of the or at least one of the chambers.

The cavity may take any suitable form, for instance it may be cylindrical, prismic, annular and/or segmented in shape.

As an alternative, the portion of the or each chamber defined by the nose piece may be a flat or convex wall.

In the first aspect of the invention, where the negative pressure device is connectable to the chamber through the nose piece (as outlined above), and the nose piece comprises a cavity which defines part of the chamber which is connectable to the negative pressure device, the negative pressure device may be connectable to that cavity.

The output shaft may comprise a cavity which defines part of the or at least one of the chambers.

The cavity may take any suitable form, for instance it may be cylindrical, prismic, annular and/or segmented in shape.

As an alternative, the portion of the or each chamber defined by the output shaft may be a flat or convex wall.

The nose piece may be slidably received within said cavity of the output shaft.

Alternatively, the nose may be slidably received within a cavity of the output shaft other than the one which partially defines the chamber (where present), or the output shaft may be slidably received within a cavity in the nose piece (where the cavity may or may not partially define the or one of the chambers). Alternatively, the nose piece and output shaft may be slidably mounted in any other suitable fashion.

The linear actuator assembly may further comprise a plunger which is connected to the output shaft and projects into an aperture in the nose piece.

The linear actuator assembly may further comprise a resilient element positioned to urge the nose piece from the retracted position towards the extended position.

The resilient element may be beneficial in providing resilient bias between the nose piece and output shaft. Where resilient bias is also provided by the gas spring mechanism described above, the resilient bias from the resilient element may supplement or oppose this.

The resilient element may be positioned to urge the nose piece to the extended position (for instance it may function as a stripper spring where the actuator assembly is used in a spot joining application) or to an intermediate position between the extended position and the retracted position (for instance it may function as a clamping spring where the actuator assembly is used in a spot joining application).

The resilient element may be an elastomeric member such as a rod, tube or block, or may be a spring such as a coil spring, volute spring, leaf spring, Belleville washer or gas spring.

The resilient element may be positioned within the or at least one of the chambers. This may provide an advantageously compact arrangement.

Where the nose piece and/or output shaft comprises a cavity which defines part of the or at least one of the chambers, the resilient element may be positioned at least partially in that cavity. Alternatively, the resilient element may be positioned in any other suitable location, such as on the outside of the output shaft and/or nose piece.

In an arrangement according to the first or second aspect of the invention:
  the linear actuator assembly may further comprise a motor configured to rotate a first threaded member relative to the housing;
  the output shaft may comprise a second threaded member; and
  the threads of the first and second threaded members are arranged to directly or indirectly act on each other to convert rotation of the first threaded member relative to the second threaded member into linear motion of the second threaded member, thereby moving the output shaft between the extended and retracted positions.

A threaded member may be considered to be any component with a helical motion transfer interface, such as screw thread, a helical groove for receipt of a lug or a lug for receipt within a helical groove.

The motor may be an electric, hydraulic, or pneumatic motor.

The second threaded member may be integral to the output shaft, or may be a separate component joined thereto.

The output shaft and the housing may be provided with mutually complementary anti-rotation features configured to restrict relative rotation of the output shaft and the housing throughout normal use.

The anti-rotation features may be configured to substantially prevent relative rotation of the output shaft and the housing throughout normal use. Alternatively, they may be configured to limit relative rotation to an angular range, such as 270 degrees, 180 degrees or 90 degrees.

The output shaft may be movable to a position in which it is at least partially received within the first threaded member.

Instead or in addition, the output shaft may be movable to a position in which the anti-rotation feature of the output shaft axially overlaps with the threads of the first threaded member.

Where the output shaft is movable to a position in which it is at least partially received within the first threaded member and also movable to a position in which the anti-rotation feature of the output shaft axially overlaps with the threads of the first threaded member, said positions may or may not be the same.

According to a third aspect of the present invention there is provided a linear actuator assembly comprising:
  a housing;
  a motor configured to rotate a first threaded member relative to the housing; and
  an output shaft comprising a second threaded member, the output shaft defining an actuator assembly axis and being movable along the actuator assembly axis between an extended position and a retracted position relative to the housing,
  wherein:
  the output shaft and the housing are provided with mutually complementary anti-rotation features configured to restrict relative rotation of the output shaft and the housing throughout normal use;

the threads of the first and second threaded members are arranged to directly or indirectly act on each other to convert rotation of the first threaded member relative to the second threaded member into linear motion of the second threaded member, thereby moving the output shaft between the extended and retracted positions; and the output shaft is movable to a position in which the anti-rotation feature of the output shaft axially overlaps with the threads of the first threaded member.

The output shaft being movable to this position may allow the actuator assembly to be axially shorter than conventional actuators where components with anti-rotation features are fitted to the actuator (one of which, as explained above, must be at least as long as the stroke length of the actuator).

The anti-rotation feature of the output shaft may axially overlap with the threads of the first threaded member in all positions, in a range of positions, or in a single position.

The motor may be an electric, hydraulic, or pneumatic motor.

The second threaded member may be integral to the output shaft, or may be a separate component joined thereto.

Said position may be the extended position, the retracted position, or a different position (for instance an intermediate position between the extended and retracted positions, or a position beyond the extended position and the retracted position).

The output shaft may be movable to a position in which it is at least partially received within the first threaded member. Said position may or may not be the same as the position in which the anti-rotation feature of the output shaft axially overlaps with the threads of the first threaded member In an arrangement according to any aspect of the invention where the output shaft is movable to a position in which it is at least partially received within the first threaded member, the output shaft may be movable to a position in which the anti-rotation feature of the output shaft axially overlaps the threads of the first threaded member by at least 20% of their total axial length. For instance, the output shaft may be movable to a position in which the anti-rotation feature of the output shaft axially overlaps the threads of the first threaded member by at least 30% or at least 40% of their total axial length.

Further, the output shaft may be movable to a position in which the anti-rotation feature of the output shaft axially overlaps the threads of the first threaded member by at least 50% of their total axial length. For instance, the output shaft may be movable to a position in which the anti-rotation feature of the output shaft axially overlaps the threads of the first threaded member by at least 60% or at least 70% of their total axial length.

The output shaft may be movable to a position in which the anti-rotation feature of the output shaft axially overlaps the threads of the first threaded member by substantially their entire axial length.

According to a fourth aspect of the present invention there is provided a linear actuator assembly comprising:
a housing;
a motor configured to rotate a first threaded member relative to the housing; and
an output shaft comprising a second threaded member, the output shaft defining an actuator assembly axis and being movable along the actuator assembly axis between an extended position and a retracted position relative to the housing,
wherein:

the output shaft and the housing are provided with mutually complementary anti-rotation features configured to restrict relative rotation of the output shaft and the housing throughout normal use;

the threads of the first and second threaded members are arranged to directly or indirectly act on each other to convert rotation of the first threaded member relative to the second threaded member into linear motion of the second threaded member, thereby moving the output shaft between the extended and retracted positions; and the output shaft is movable to a position in which it is at least partially received within the first threaded member.

The second threaded member being at least partially receivable within the first threaded member may reduce the number of design constraints placed upon the second threaded member, and indeed the output shaft as a whole. For instance, it may allow the output shaft to define a central cavity, which may form part of a chamber as described above, may form part of a chamber of a conventional gas spring mechanism, or may be used to contain other components such as stripper springs and/or clamping springs. In contrast, in existing arrangements where the first threaded member is a solid rod, so as to avoid the actuator assembly being of excessive length the output shaft must be tubular so as to accommodate the rod. This prevents the output shaft from containing other components such as those mentioned above. These components must then be accommodated elsewhere, increasing the dimensions of the actuator assembly as a whole.

The output shaft may be at least partially received within the first threaded member in all positions, in a range of positions, or in a single position.

The part of the output shaft which is received within the first threaded member may be a part of or all of the second threaded member, and/or a part of or all of the remainder of the output shaft.

The first threaded member may be internally threaded. At least part of the output shaft may be received within the internal threads of the first threaded member when the output shaft is in said position.

Said position may be the extended position, the retracted position, or a different position (for instance an intermediate position between the extended and retracted positions, or a position beyond the extended position or the retracted position).

In an arrangement according to any aspect of the invention where the output shaft is movable to a position in which it is at least partially received within the first threaded member, the first threaded member may be internally threaded, and the output shaft may be movable to a position in which at least part of it is received within the threads of the first threaded member to a depth of at least 50% of their total axial length. For instance, the output shaft may be movable to a position in which at least part of it is received within the threads of the first threaded member to a depth of at least 30% or at least 40% of their total axial length.

Further, the output shaft may be movable to a position in which at least part of it is received within the threads of the first threaded member to a depth of at least 50% of their total axial length. For instance, the output shaft may be movable to a position in which at least part of it is received within the threads of the first threaded member to a depth of at least 60% or at least 70% of their total axial length.

The output shaft may be movable to a position in which at least part of it is received within the threads of the first threaded member along substantially their entire axial length. As one alternative, the first threaded member may be externally threaded, the second threaded member being at least partially received in an alternative location in the first threaded member.

In an arrangement according to any aspect of the invention where the output shaft and the housing are provided with mutually complementary anti-rotation features, the mutually complementary anti-rotation features may comprise a key provided on one of the housing and the output shaft, projecting into a keyway provided in the other of the housing and the output shaft.

As an alternative, the output shaft may be non-circular in cross section and received within a complementary-shaped aperture in the housing (for instance the output shaft may be hexagonal and received within a hexagonal aperture in the housing).

The key may be provided on the housing and the keyway may be provided in the output shaft.

The keyway being provided on the output shaft may be beneficial in obviating the risk of collision (for instance with the housing or the first threaded member) which may be present if the key were mounted on the output shaft.

Alternatively, the key may be provided on the output shaft and the keyway in the housing.

In an arrangement according to any aspect of the invention comprising first and second threaded members, the first and second threaded members may be arranged to act indirectly on each other through one or more intermediate threaded members. For instance, the first threaded member, second threaded member and intermediate threaded rollers may form a roller screw mechanism. Alternatively, the first and second threaded members may be arranged to act indirectly on each other through one or more non-threaded intermediate members. For instance, the first and second threaded members and the intermediate members may form a ball screw mechanism. As another alternative, the first and second threaded members may be arranged to act directly on each other (for example they may form a lead screw mechanism).

A linear actuator assembly according to the third or fourth aspects of the invention may further comprise a nose piece which is slidably mounted to the output shaft and movable between an extended position and a retracted position relative to the output shaft In an arrangement according to any aspect of the invention comprising a nose piece, the linear actuator assembly may further comprise a sensor for detecting the position of the nose piece relative to the output shaft or relative to the actuator body.

The sensor may take any suitable form. For instance, it may be an optical (e.g. laser), magnetic, inductive, capacitive or eddy current encoder.

According to a fifth aspect of the present invention there is provided a spot-joining apparatus comprising a linear actuator assembly according to any preceding claim, wherein the output shaft of the linear actuator assembly is connected to a punch for driving a fastener or die, or effecting a clinching or friction stir spot welding operation.

A spot-joining apparatus according to the fifth aspect of the invention may provide one or more of the benefits (such as ability to handle a wider variety of workpiece geometry, and/or compactness) discussed in relation to the first, second, third and fourth aspects of the invention.

Where the output shaft comprises a plunger, the punch may be connected to the plunger.

According to a sixth aspect of the present invention there is provided a method of manufacturing a product, the method comprising fastening together two or more layers of a workpiece using a spot-joining apparatus according to the fifth aspect of the invention.

A method according to the sixth aspect of the invention may be more versatile and widely applicable due to one or more of the benefits (such as ability to handle a wider variety of workpiece geometry, and/or compactness) discussed in relation to the first, second, third and fourth aspects of the invention. This increased versatility and wider applicability may reduce the number of pieces of apparatus required to produce a particular product or range of products, thereby reducing the size and/or cost of a manufacturing unit capable of producing those products.

According to an seventh aspect of the present invention there is provided a product comprising a workpiece formed from two or more layers fastened together using a spot-joining apparatus according to the fifth aspect of the invention or a method according to the sixth aspect of the invention.

A product according to the seventh aspect of the invention may have fewer design constraints placed upon it due to the increased versatility and/or applicability of the fifth and/or sixth aspects of the invention. For instance, the product may be produced at reduced cost due to the size and/or cost of the manufacturing unit required being reduced (as outlined above). Alternatively or in addition, the product may comprise a workpiece of geometry which could not be joined, or which could not be joined economically, by conventional methods and apparatus.

In relation to the sixth or seventh aspect of the invention, the product may be a vehicle (such as a motorcycle, car, van, lorry or aircraft). Examples of layers of a workpiece include the chassis of a vehicle, thermal/acoustic insulation panels and vehicle bodywork panels. More generally, conventional workpiece layers are usually metal (for instance steel or aluminium), but may be any other suitable material such as polymer or composite material (such as carbon fibre).

A specific embodiment of the present invention will now be described, by way of example only, with reference to the accompanying drawings in which.

Figure 1:
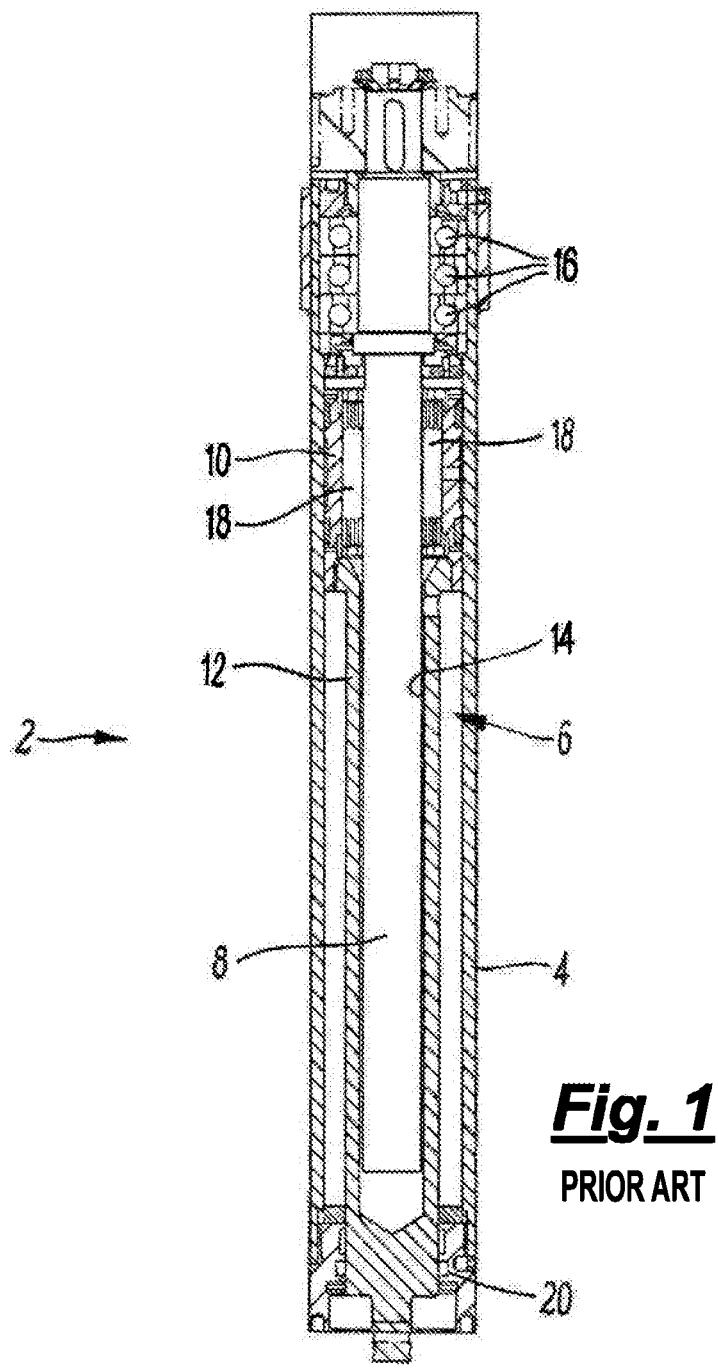
FIG. 1 is a cross-sectional side view of a known motor-driven linear actuator.

FIG. 1 shows an electrical motor-driven linear actuator 2 of known design. It has a housing 4, a motor (not shown), and an output shaft 6. The motor is drivingly connected to a first threaded member 8, in the form of a roller screw shaft, by a drive belt (not shown). The output shaft 6 comprises a second threaded member 10 in the form of an internally-threaded roller nut. The portion of the output shaft 6 that is not the roller nut 10 will hereafter be referred to as the main body 12. The output shaft 6 defines a longitudinal axis which is vertical from the perspective of FIG. 1. This longitudinal axis corresponds to the actuator axis.

The output shaft 6 is movable along the actuator axis between a retracted position, as shown in FIG. 1, and an extended position, in which the output shaft projects from the housing 4 (downwards from the perspective of FIG. 1) to a greater extent. With the output shaft 6 in the retracted position, a portion of the first threaded member 8 is received within a cavity 14 in the output shaft 6. This allows the first threaded member 8 and the output shaft 6 to be 'nested' when the output shaft is in the retracted position, reducing the overall axial length of the actuator assembly 22. The cavity 14 extends all the way through the second threaded member 10, and along the majority of the axial length of the main body 12. With the output shaft 6 in the extended position the roller screw shaft 8 projects only into the portion of the cavity 14 defined by the roller nut.

It is to be noted that especially in actuators for high-force applications such as SPR, it is universally the first threaded member 8 which can be nested within the second threaded member 10, rather than vice versa. This is because (within sensible limits) for a given cross sectional area a tubular member will be more resistant to bending moments than a solid cylinder. Although such actuators are primarily designed to work with tensile and/or compressive loads, in many applications some lateral loading may be inevitable. For instance, in SPR the actuator 2 may be mounted on one end of a force reaction frame such as a C-frame. During rivet insertion the C-frame warps slightly and its arms splay outward from one another. This deflection tilts the actuator axis so that it is no longer perpendicular to the plane of the workpiece, and as a result the reaction force from the workpiece has a lateral component which must be withstood by the output shaft 6. As an additional point, it will be apparent that if the actuator 2 of FIG. 1 were modified so that it was the roller nut 10 which was rotated within the housing 4 rather than the roller screw shaft 8, bearings 16 would have to be repositioned between the roller nut 10 (or the main body 12) and the housing 4. This would require the diameter of the housing 4, and thus the weight and bulk of the actuator 2, to be increased.

The first threaded member 8 is mounted for rotation within the housing 4 by three sets of bearings 16. The first and second threaded members 8, 10 are configured to act indirectly on one another through a plurality of intermediate threaded members 18 in the form of threaded rollers. The first, second and intermediate threaded members 8, 10, 18 co-operatively form a roller screw mechanism. As described above, by energising the motor (not shown) to rotate the first threaded member 8, while restricting the rotation of the second threaded member 10, the second threaded member (and thus the entire output shaft 6) can be moved linearly (along the actuator axis) between the retracted position and the extended position. The direction in which the output shaft 6 moves along the actuator axis is determined by the direction of rotation of the first threaded member. Hereafter, rotation of the first threaded member 8 in the direction which extends the output shaft 6 (i.e. which moves the output shaft forwards towards the extended position) will be referred to as rotation 'forwards', and rotation of the first threaded member 8 in the direction which retracts the output shaft 6 (i.e. which moves the output shaft backwards towards the retracted position) will be referred to as rotation 'backwards'.

As described above, for the roller screw mechanism of the actuator 2 to cause the output shaft 6 to move linearly, the rotation of the roller nut 10 must be restricted. However, the actuator 2 itself does not comprise means for doing so. This allows the output shaft 6 to be circular in cross section, which in turn enables the boundary between it and the housing 4 to be sealed effectively (in this case by an o-ring 20). This sealing is of importance so as to prevent egress of lubricant, and/or ingress of dirt or debris which could damage the threads of the threaded members 8, 10, 18.

Figure 2:
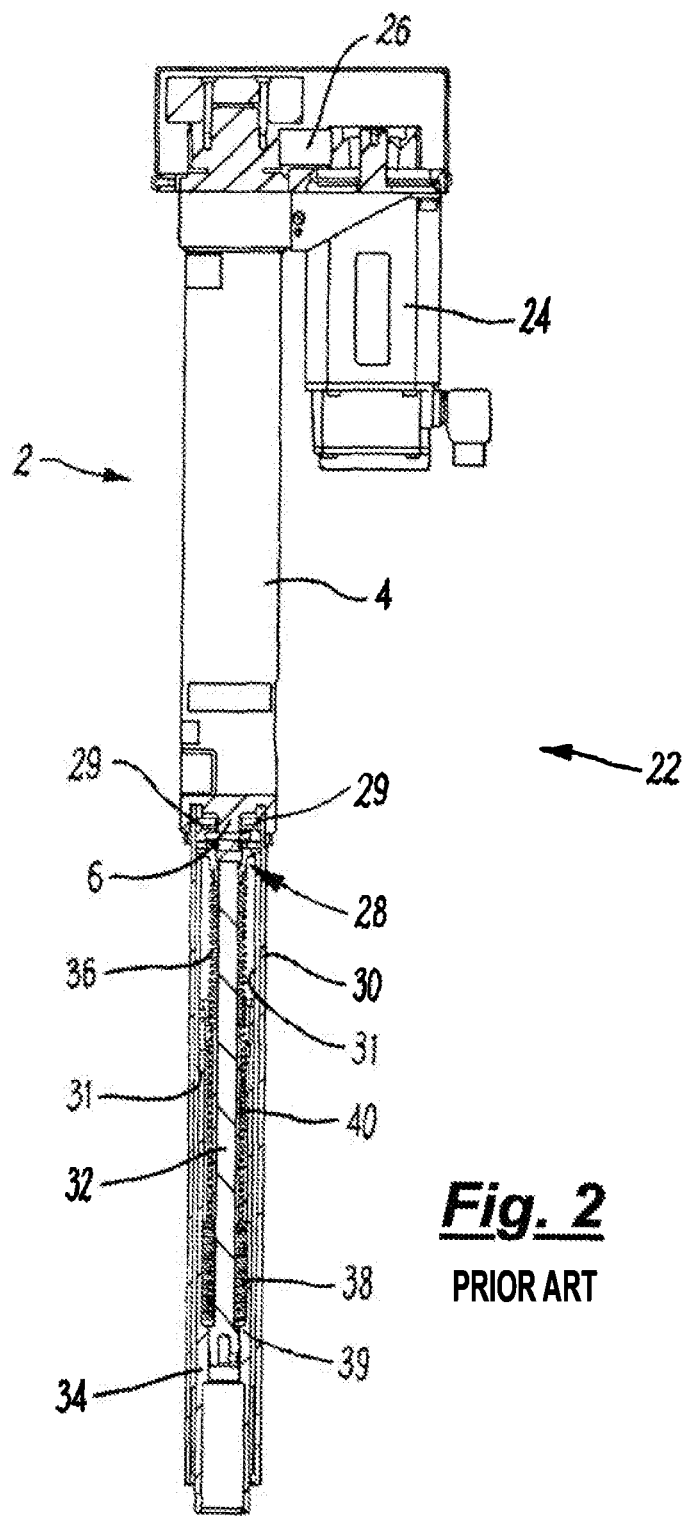
FIG. 2 is a side view of a known linear actuator assembly, comprising the linear actuator of FIG. 1, in partial cross section.
Figure 3:
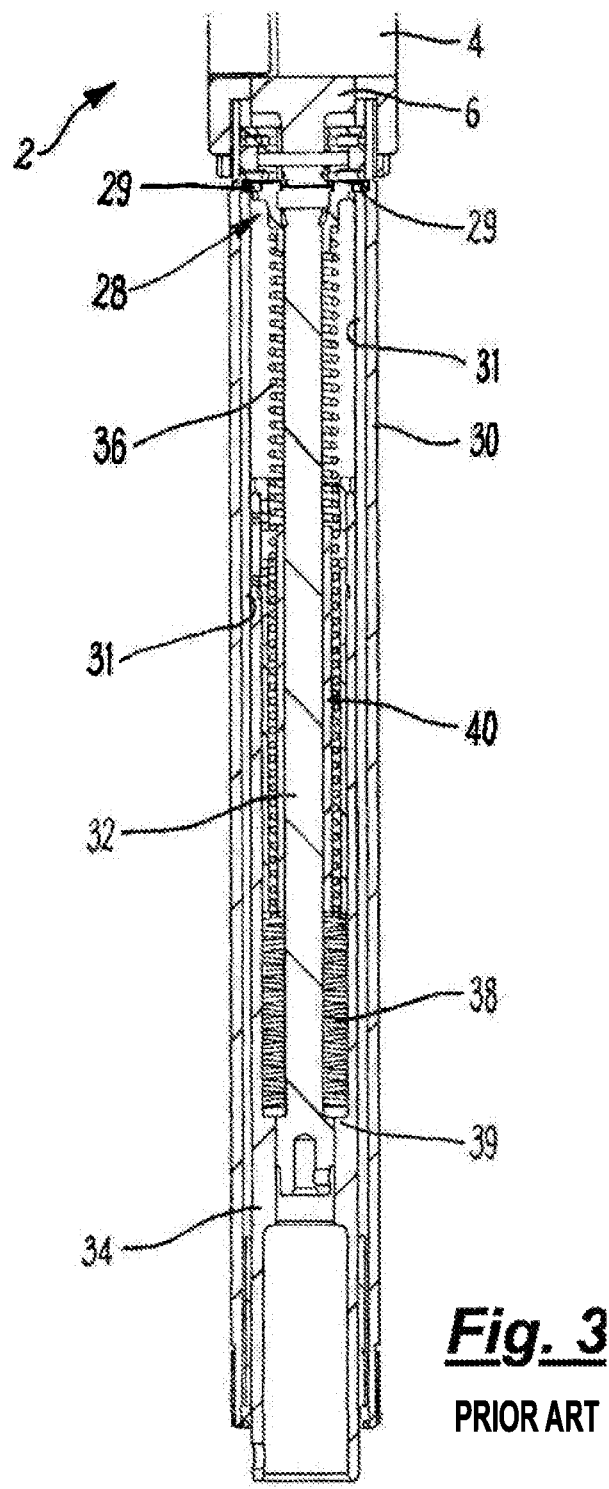
FIG. 3 is a cross-sectional side view of a portion of the linear actuator assembly of FIG. 2.

FIGS. 2 and 3 show an actuator assembly 22 comprising the linear actuator 2 described above. In FIG. 2, the motor 24 and drive belt 26 of the linear actuator 2 are visible. The actuator assembly 22 has a key assembly 28 mounted to the output shaft 6 and a support tube 30 mounted to the housing 4. The support tube 30 is positioned with its longitudinal axis parallel to the actuator axis, so that when the output shaft 6 is in the extended position it runs down the middle of the support tube 30. The support tube 30 has a pair of keyways 31, each of which receives a key 29 of the key assembly 28. The keys 29 being received in the keyways 31 prevents the output shaft 6 from rotating relative to the support tube 30. The support tube is fixed to the housing 4 so that it cannot rotate relative to the housing, therefore the output shaft 6 is also prevented from rotating relative to the housing 4. The roller screw mechanism of the actuator 2 can therefore function to extend or retract the output shaft as described above.

The inner diameter of the support tube 30 is a close sliding fit with both the nose piece 34 and the output shaft 6. This enables it to provide lateral support to these components so that they can withstand the lateral loading discussed above. The lateral support provided by support tubes of this type have led to this arrangement being adopted universally for actuators for high-force applications.

A plunger 32, which is an elongate component positioned to transmit force from the output shaft 6, is mounted to the distal end of the output shaft. Positioned concentrically between the support tube 30 and the plunger 32 is a nose piece 34, which is a component positioned at or beyond the distal end of the output shaft 6 which is movable relative to both the output shaft 6 and the housing 4. If the actuator assembly 22 were to be used for SPR, a punch would be mounted to the plunger, and a tool nose (comprising a clamp surface and a rivet feed mechanism) would be mounted to the nose piece. A stripper spring 36 in the form of a coil spring, and a clamping spring 38 in the form of a stack of Belleville washers, are provided between the key assembly 28 and a shoulder 39 of the nose piece. A force transfer sleeve 40 runs along part of the axial distance between the clamping spring 38 and the key assembly 28.

To drive a self-piercing rivet (with a punch mounted to the plunger and a tool nose mounted to the nose piece, as indicated above), the motor 24 rotates the first threaded member (8 in FIG. 1) forwards so as to move the output shaft 6 towards the extended position, forwards towards a workpiece to be riveted. As the output shaft 6 moves forwards (downwards from the perspective of FIGS. 2 and 3) within the support tube 30, it pushes the stripper spring 36 forwards. The stripper spring 36 is therefore pushed against the clamping spring 38 which in turn is pushed against the shoulder 39 of the nose piece 34. The nose piece 34 therefore moves forward along with the output shaft 6, projecting from the support tube 30 to a greater extent.

The output shaft 6 and nose piece 34 continue moving forwards together until the clamp surface of the tool nose (not shown) contacts the workpiece. At that point, forward movement of the nose piece 34 stops but the output shaft 6 continues. The stripper spring 36 therefore begins to be compressed between the key assembly 28 and the clamping spring 38, and the plunger 32 begins to move forwards relative to the nose piece 34. This moves the punch (not shown) forwards within the tool nose (not shown) and towards the workpiece.

The actuator assembly 22 is configured so that when the punch reaches the point where the rivet is about to begin penetrating the workpiece, the stripper spring 36 has been compressed to the point at which the key assembly 28 contacts the force transfer sleeve 40. Beyond that point, continued forward movement of the output shaft 6, during which time the rivet is penetrating the workpiece, compresses the clamping spring 38. The restorative force from the clamping spring 38 (as well as force from continued compression of the stripper spring 36) urges the nose piece 34, and therefore the tool nose (not shown), against the workpiece to clamp it. Rivet insertion is complete at or before the point at which the clamping spring 38 reaches its solid length.

After the rivet has been inserted, the output shaft 6 is retracted. At first, as the output shaft 6 moves backwards the nose piece remains stationary, under action of the clamping spring 38 and stripper spring 36. Once the output shaft 6 has moved far enough backwards that the key assembly 28 no longer touches the force transfer sleeve 40, the nose piece remains stationary under action of the stripper spring 36 alone. Once the stripper spring 36 reaches its original length, further rearward movement of the output shaft 6 pulls the nose piece 34 back with it until the assembly reaches the position shown in FIG. 3.

Figure 4:
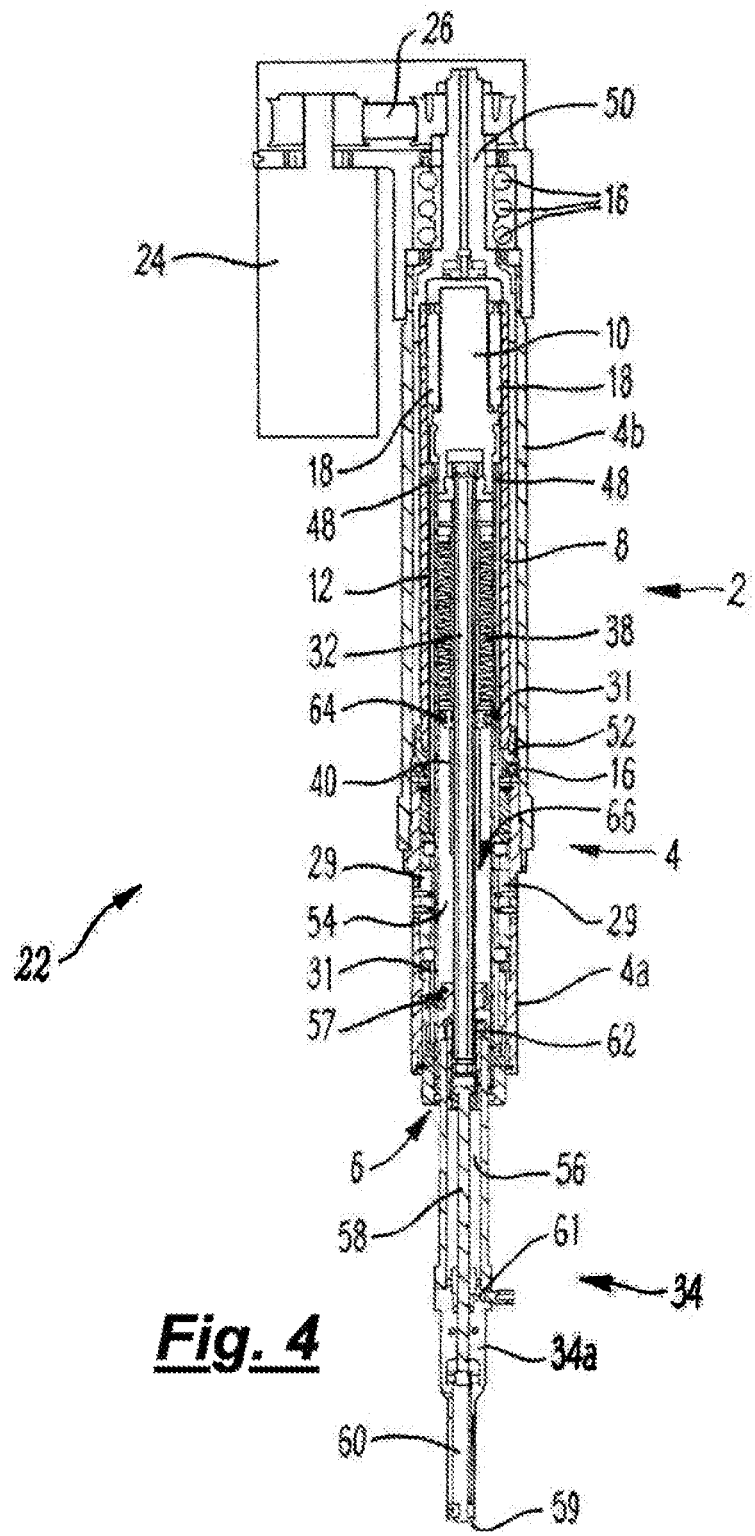
FIG. 4 is a cross-sectional side view of a linear actuator assembly according to an embodiment of the invention, with an output shaft in a retracted position and a nose piece in an extended position.

FIG. 4 shows a linear actuator assembly 22 according to an embodiment of the invention. The actuator assembly of this embodiment has a number of features in common with the assembly of FIGS. 2 and 3, therefore only the differences will be described in detail.

Like the assembly of FIGS. 2 and 3, it has an actuator 2 with a housing 4, a motor 24 and an output shaft 6. The housing 4 of this embodiment has a front portion 4a and a rear portion 4b. As with the above arrangement, the motor is drivingly connected to a first threaded member 8 by a drive belt 26, and the output shaft 6 comprises a second threaded member 10 and a main body 12. The output shaft 6 defines a longitudinal axis, which corresponds to the actuator axis. This is vertical from the perspective of FIG. 4. The output shaft 6 is movable along the actuator axis between a retracted position, as shown in FIG. 4, and an extended position, in which the output shaft projects from the housing 4 (downwards from the perspective of FIG. 4) to a greater extent. This will be discussed in more detail below.

Like the assembly of FIGS. 2 and 3, the first and second threaded members 8, 10 act indirectly on each other through intermediate threaded members 18 in the form of rollers, forming a roller screw mechanism by which the output shaft 6 can be extended and retracted (if the rotation of the second threaded member is restricted). However, in this embodiment it is the second threaded member 10 (and the main body 12) that can be nested within the first threaded member 8, rather than the other way round. More particularly, the first threaded member takes the form of an elongate roller nut and the threaded member takes the form of a (relatively short) roller screw shaft. This will be discussed in more detail below.

The roller nut tube (the first threaded member) 8 is mounted for rotation within the housing 4 (in this case the rear portion 4b of the housing) by a drive shaft 50, a support ring 52, and four sets of bearings 16. The rear end (i.e. the upper end from the perspective of FIG. 4) of the first threaded member 8 is fixed to the drive shaft 50, which in turn is supported in the housing by three bearings 16 and rotatable by the motor so as to rotate the first threaded member. At its bottom end, the first threaded member 8 is fixed to the support ring 52 which in turn is mounted within the housing 4 by a bearing 16. Energisation of the motor 24 therefore rotates the drive shaft 50, roller nut tube 8 and support ring 52 together within the housing 4.

As outlined above, the first and second threaded members 8, 10 are configured to act indirectly on one another through the intermediate threaded members 18 to extend and retract the output shaft 6. As discussed previously, this requires the rotation of the second threaded member 10 relative to the housing 4 to be restricted. Rather than using a support tube, in this embodiment the housing 4 and output shaft 6 are provided with mutually complementary anti-rotation features. More particularly, the housing 4 (in this case the front portion 4a) has a pair of keys 29 and the main body 12 of the output shaft 6 has a pair of keyways 31, each of which receives one of the keys. Throughout normal use of the actuator assembly 22, the keys 29 prevent the output shaft 6, and thus the second threaded member 10, from rotating relative to the housing 4.

The rearmost ends 48 of the keyways 31 are marked on FIG. 4. This illustrates that with the output shaft 6 in the retracted position, the keyways 31 (the anti-rotation feature of the output shaft 6) axially overlap with the threads of the first threaded member 8 (which run along substantially the entire axial length of the first threaded member). More particularly, in this embodiment the keyways 31 overlap with the threads of the first threaded member by around 60% of their total axial length. In other words, the keyways 31 project around half way into the threaded portion of the first threaded member 8 (which in this case is substantially the entire first threaded member).

Figures 5A, 5B:
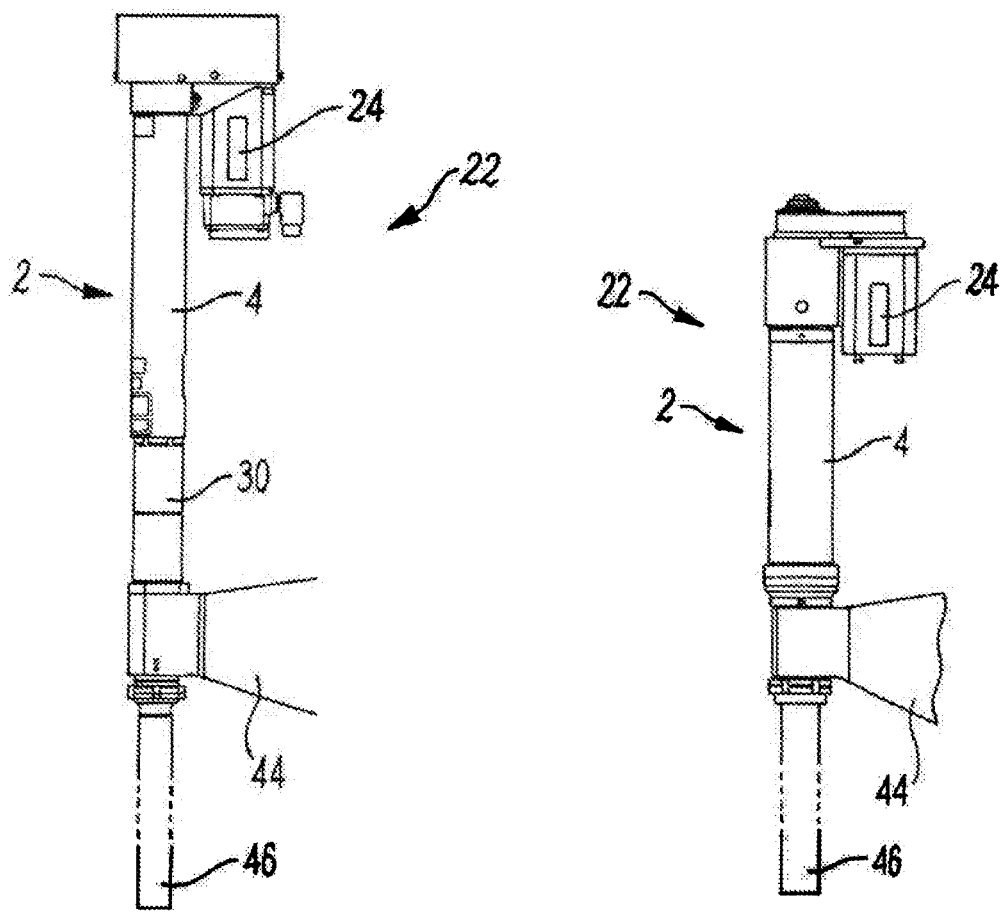
FIG. 5A is a side view of the actuator assembly of FIG. 2, mounted to an arm of a force reaction frame.
FIG. 5B is a side view of the linear actuator assembly of the embodiment, mounted to an arm of a force reaction frame.

The anti-rotation feature 31 of the output shaft 6 and the threads of the first threaded member being positionable to axially overlap obviates the requirement for anti-rotation features to be provided to the front or rear of the actuator (such as the guide tube of the arrangement of FIGS. 2 and 3), which as explained above must be at least as long as the stroke length of the actuator. Comparing FIGS. 5A and 5B demonstrates the reduction in length which may be provided for equivalent stroke actuators. Both actuator assemblies are shown mounted to one arm 44 of a force reaction frame, with their nose pieces 34 shown in broken outline.

Returning to FIG. 4, like the arrangement of FIGS. 2 and 3 the actuator assembly 22 of the embodiment has a plunger 32, a clamping spring 38 in the form of a stack of Belleville washers, a force transfer sleeve 40 and nose piece 34. In this embodiment, each of these components are coaxial with the actuator axis, however in other embodiments this may not be the case for one or more of these components (where present). The main body 12 of the output shaft 6 has a cavity 54 within which the plunger 32, clamping spring 38 and force transfer sleeve 40 are received. In addition, the nose piece 34 is slidably received within the cavity 54. The nose piece 34 is therefore slidably mounted to the output shaft 6, and can be moved relative to the output shaft between an extended position (as shown in FIG. 4) and a retracted position (in which it projects forwards from the output shaft to a lesser extent).

The actuator assembly 22 of this embodiment is for SPR spot joining. It has a punch 58 for driving a rivet mounted to the plunger 32 (coaxially in this case), and the nose piece 34 comprises a tool nose 34*a*. The tool nose 34*a* has an annular clamp surface 59 surrounding a punch channel 60. The nose piece 34 also defines a cavity 56, and has a duct 61 in fluid communication with that cavity. The mouth 57 of the cavity 56 forms an aperture into which the plunger 32 is received, providing the plunger with additional lateral stability. An o-ring 55 is held compressed between the nose piece 34 and the punch 58, and prevents air escaping through the front of the cavity 56.

Figure 6:
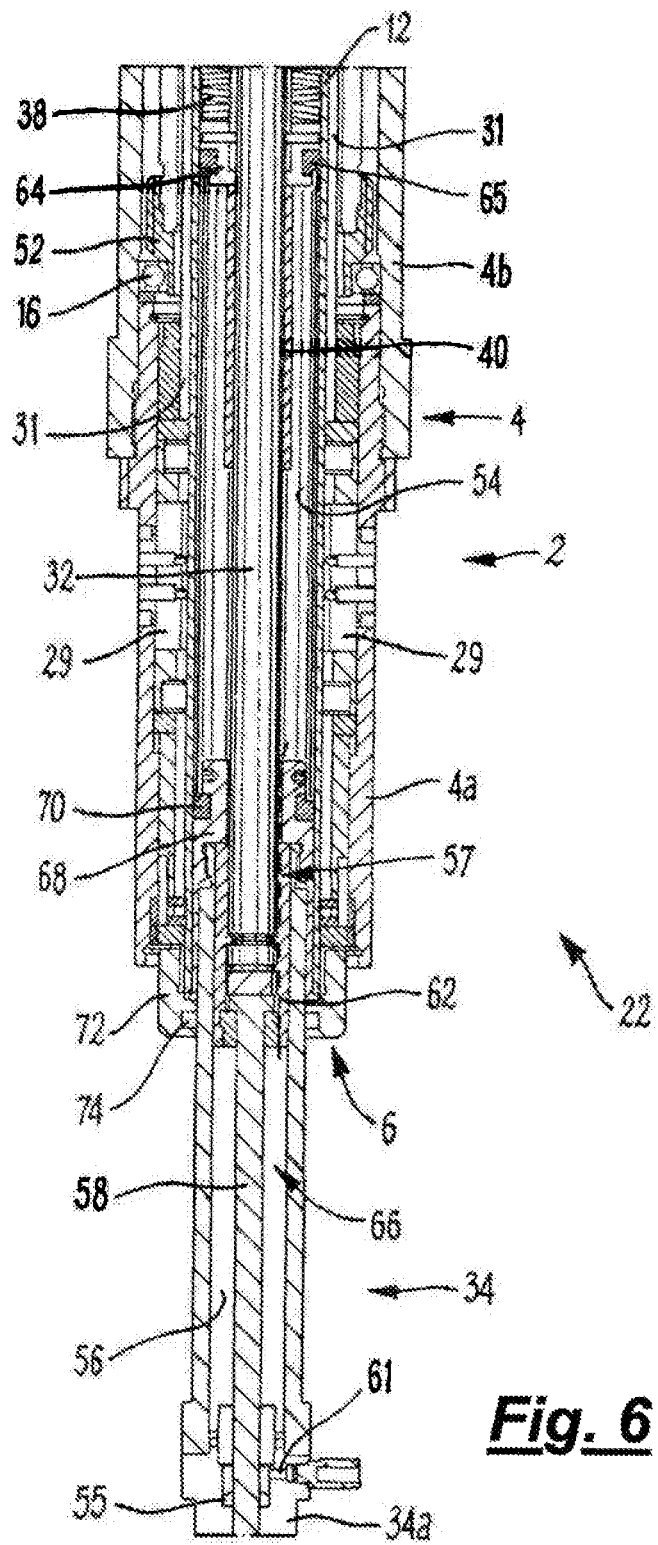
FIG. 6 is a cross-sectional side view of the linear actuator assembly of the embodiment, with its output shaft in a partially-extended position and its nose piece in the extended position.

As shown more clearly in FIG. 6, the cavity 54 in the output shaft 6 and the cavity 56 in the nose piece are in fluid communication with each other through a leakage path 62. FIG. 6 also shows more clearly that in this embodiment, a flange plate 64 is positioned between the force transfer sleeve 40 and the clamping spring 38. The flange plate acts to better distribute the load transferred between the force transfer sleeve 40 and the clamping spring 38 (discussed below). The flange plate 64 also comprises a seal 65, which prevents flow of fluid across the flange plate within the cavity 54. The nose piece 34 comprises a further flange plate 68 positioned at its rear. This flange plate 68 acts to distribute the load applied between the nose piece 34 and the force transfer sleeve 40 (also discussed below). An o-ring 70 seals the flange plate 68 against the main body 12, preventing flow of fluid therebetween. FIG. 6 further shows that the output shaft 6 has an end nut 72 positioned at its front, which is sealed against the nose piece 34 by a wiper seal 74. In this embodiment, the wiper seal 74 acts to prevent ingress of debris or water, and egress of lubricant, as the nose piece 34 slides within the cavity 54.

Although the arrangement of FIGS. 2 and 3 had a stripper spring in the form of a coil spring, in this embodiment the function of the stripper spring is performed by a gas spring mechanism co-operatively formed by the output shaft 6 and the nose piece 34. The cavities 54, 56 in the output shaft 6 and nose piece 34 (along with the flange plates 64, 68 and the o-rings 65, 70, 55) cooperatively form a chamber 66 for containing a volume of gas. In this embodiment, the chamber 66 is bifurcated in that it has a narrowed portion (the leakage path 62). If the chamber 66 is sealed, for instance by blocking the duct 61 (e.g. by closing a valve connected thereto), moving the nose piece 34 backwards relative to the output shaft 6, towards the retracted position, would push the nose piece 34 deeper into the cavity 54 in the output shaft. This would reduce the open volume of the cavity 54, raising the gas pressure within the cavity 54 and thus within the chamber 66 as a whole. This increase in pressure would act to urge the nose piece 34 back towards the extended position.

The chamber 66 can also be utilised to retract the nose piece 34, for instance when the output shaft 6 is in the retracted position, thereby reducing the axial length of the actuator 2. The duct 61 is connected to a negative pressure device (not shown) and by operating the negative pressure device, the gas pressure in the cavity 56 in the nose piece (and thus in the chamber 66 as a whole) can be reduced. Reducing the pressure in the chamber 66 sucks the nose piece 34 backwards towards the retracted position. When the chamber 66 is to function as a gas spring again it can be re-pressurised, for instance by stopping the negative pressure device and letting the pressure in the cavity 66 return to ambient pressure, or by using a pump or compressed gas cylinder to raise the pressure in the cavity beyond ambient pressure (thereby increasing the spring constant of the gas spring mechanism).

Returning to FIG. 4, as outlined above in this embodiment the output shaft 6 can be nested with (i.e. at least partially received within) the first threaded member 8. More particularly, in the retracted position the output shaft runs though the entire length of the first threaded member 8. In other words with the output shaft 6 in the retracted position a portion of it (in this case a front portion of the second threaded member 10 and a rear portion of the main body 12) is received within the threads of the first threaded member 8 along substantially their entire axial length. The output shaft 6 being movable so that it is nested within the first threaded member 8, rather than vice versa, removes the requirement for the output shaft to be hollow at the rear so as to accommodate the first threaded member. This allows peripheral components to be located within the output shaft, rather than being situated in a position which would increase the size of the assembly as a whole. For instance, in this embodiment space within the output shaft 6 is used to partially define the chamber 66, and to accommodate the components positioned therein (i.e. the plunger 32, clamping spring 38 and force transfer sleeve 40). Although the output shaft 6 being received within the first threaded member 8 rather than vice versa may reduce the lateral strength of the output shaft to some extent, in some applications the above advantages are of more value than lateral strength. For instance, the problem of lateral loading can be addressed in other ways, for example by using materials of higher strength or by minimising the lateral forces themselves (for instance this can be done in SPR by utilising a stiffer C-frame, or one arranged to maintain axial alignment of punch and die during its loading cycle).

Figure 7:
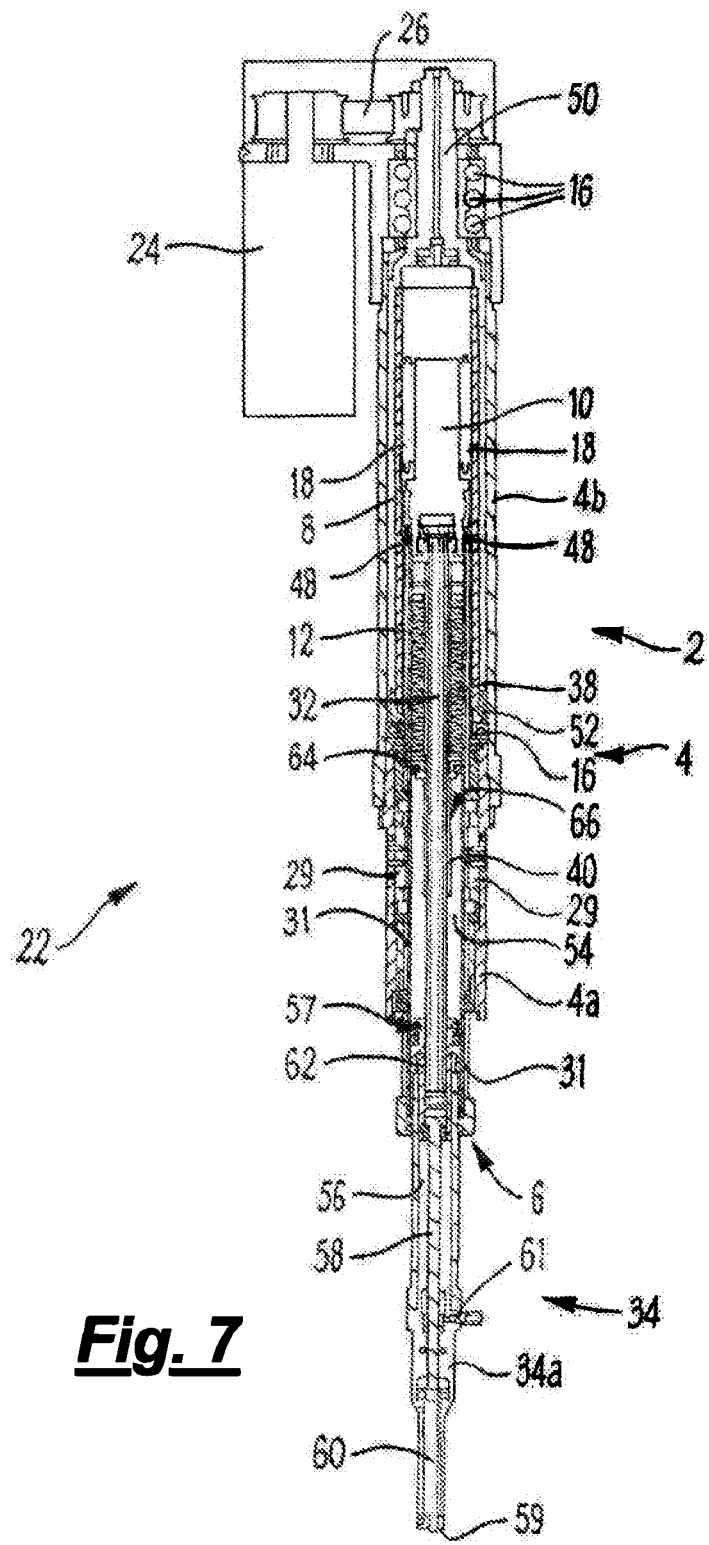
FIG. 7 is a cross-sectional side view of the linear actuator assembly of the embodiment, with its output shaft in another partially-extended position and its nose piece in a partially-retracted position.

To drive a self-piercing rivet (not shown) using the actuator assembly 22 of the embodiment, the motor 24 rotates the first threaded member 8 forwards (as defined previously) so as to move the output shaft 6 towards the extended position, forwards towards a workpiece to be riveted. As the output shaft 6 moves forwards (downwards from the perspective of FIG. 4), the nose piece 34 is carried forward by it. The chamber 66 is sealed, acting as a gas spring and keeping the nose piece 34 in the extended position. FIG. 7 shows the actuator assembly with the output shaft 6 advanced part way to the extended position (i.e. an intermediate position between the retracted position and the extended position). With the output shaft 6 in this position, the keyways 31 overlap with the threads of the first threaded member 8 by around 50% of their total axial length, and part of the output shaft 6 is received within the threads of the first threaded member to a depth of around 85% of their total axial length (which is the total axial length of the first threaded member 8).

Figure 8:
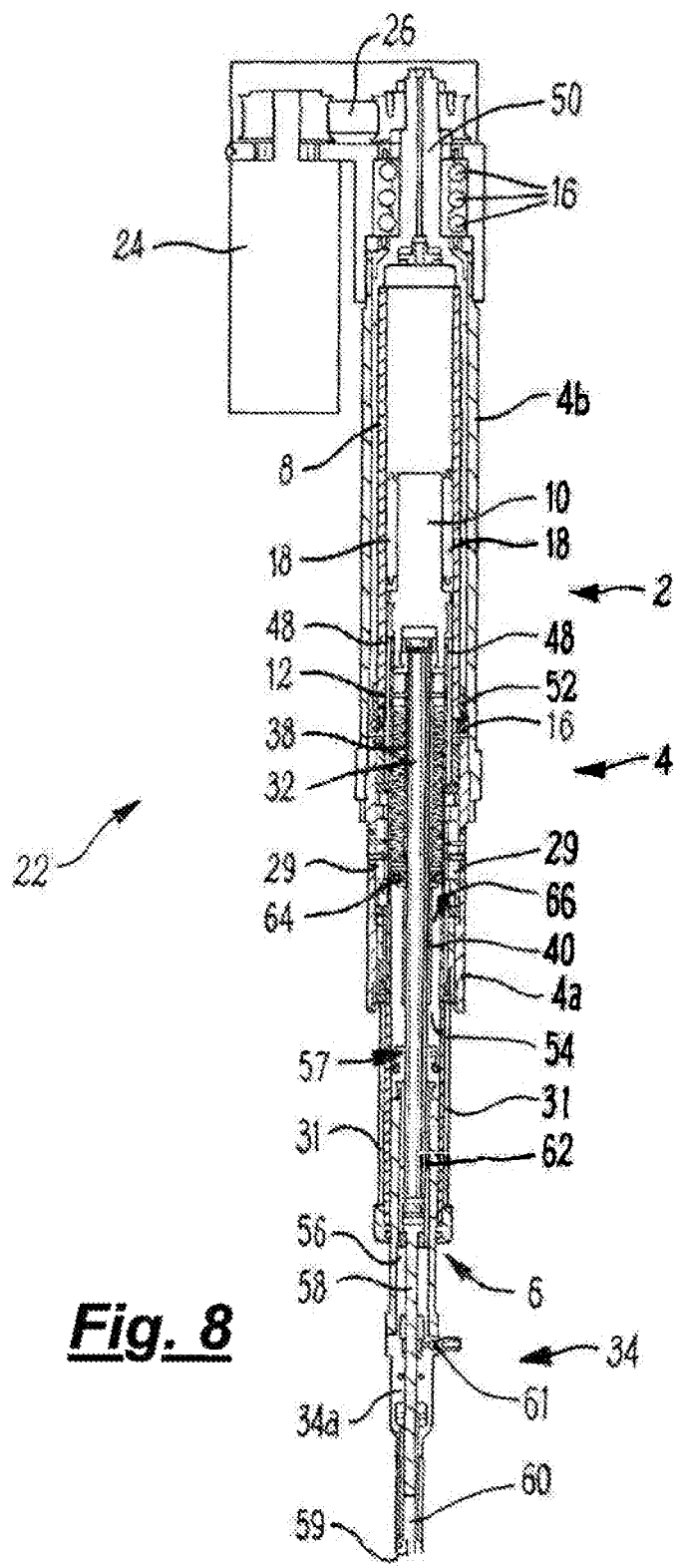
FIG. 8 is an enlarged cross-sectional view of a portion of the linear actuator assembly of the embodiment.

The output shaft 6 and nose piece 34 continue moving forwards together until the clamp surface 59 of the tool nose 34*a* contacts the workpiece. At that point, forward movement of the nose piece 34 stops but the output shaft 6 continues. This pushes the nose piece 34 backwards relative to the output shaft 6, moving it towards the retracted position. This, in turn, reduces the volume of the cavity 54 and thus of the chamber 66, which increases the pressure of the gas in the chamber and urges the nose piece against the workpiece. With the nose piece 34 stationary and the output shaft 6 continuing to move forwards, the plunger 32 moves forwards within the nose piece 34, which moves the punch 58 forwards within the punch channel 60 of the tool nose 34a and towards the workpiece. FIG. 8 shows the actuator assembly with the output shaft 6 advanced further towards the extended position (i.e. an intermediate position between the position of FIG. 8 and the extended position). With the output shaft 6 in this position, the keyways 31 overlap with the threads of the first threaded member 8 by around 15% of their total axial length, and part of the output shaft 6 is received within the threads of the first threaded member to a depth of around 55% of their total axial length (which is the total axial length of the first threaded member 8).

The actuator assembly 22 of this embodiment is configured so that when the punch 58 reaches the point where the rivet is about to begin penetrating the workpiece, the nose piece has been moved backwards relative to the output shaft 6 to the point at which it contacts the force transfer sleeve 40. Beyond that point, continued forward movement of the output shaft 6, during which time the rivet is penetrating the workpiece, compresses the clamping spring 38. The restorative force from the clamping spring 38, as well as force from continued reduction in volume of (and thus increase in pressure in) the chamber 66, urges the nose piece 34, and therefore the clamp surface 59 of the tool nose 34a, against the workpiece to clamp it. Rivet insertion is complete at or before the point at which the clamping spring 38 reaches its solid length (which in this embodiment is the point at which the nose piece 34 reaches the retracted position).

After the rivet has been inserted, the output shaft 6 is retracted. At first, as the output shaft 6 moves backwards the nose piece 34 remains stationary, under action of the clamping spring 38 and force from the pressure in the chamber 66. The nose piece 34 therefore begins to move back towards the extended position. Once the output shaft 6 has moved far enough backwards that the nose piece 34 no longer touches the force transfer sleeve 40, the nose piece remains stationary under action of the gas spring alone. Once the output shaft 6 has moved backwards far enough that the nose piece 34 can return to the extended position, as the output shaft continues to travel backwards the nose piece will travel back with it until the assembly 22 reaches the position shown in FIG. 4.

The actuator assembly 22 of this embodiment has a first laser positional encoder (not visible) which is configured to provide information to a control unit (not visible) on the relative positions of the output shaft 6 and the housing 4. The actuator assembly 22 also has a second laser positional encoder (not visible) which provides information to the control unit on the relative positions of the output shaft 6 and the nose piece 34. In combination, these encoders allow the total thickness of a workpiece being joined to be calculated. Since in SPR the housing 4 remains a fixed distance away from a die (not visible), the information from the first encoder regarding the position of the output shaft 6 relative to the housing 4 allows the control unit to deduce the position of the output shaft relative to the die. From the information from the second encoder (not visible), the control unit (not visible) can deduce when the nose piece 34 contacts the workpiece during forward travel of the output shaft 6 (i.e. when the nose piece begins to be retracted relative to the output shaft), and from the information from the first encoder the control unit can deduce the position of the output shaft at that point. The control unit can therefore determine how far from the die the output shaft 6 is when the nose piece 34 contacts the workpiece, and from this can calculate the thickness of the workpiece.

Feedback from the first and/or second encoders may be used to provide other useful information. For instance, the control unit may determine, from the information provided by the first and second encoders, the speed of advance of the output shaft 6 and the speed of retraction of the nose piece 34. The difference between these two speeds (i.e. the nose piece 34 being retracted more slowly than the output shaft 6 advances) represents compression of the workpiece. This may be used to analyse the closing of air gaps between workpiece layers, the spread of adhesive between layers, and/or the mechanical strength of the workpiece (since some mechanical deformation of the workpiece under the force of the nose piece may take place if the workpiece is relatively soft). Further, information such as the end position of the output shaft 6 relative to the housing 4 (for example) may be used to calculate deflection of a force reaction frame to which the actuator assembly 22 is mounted.

In other embodiments, information may be provided by one or more sensors configured differently. For instance, if the second sensor was instead positioned to provide information on the relative positions of the nose piece 34 and the housing 4, the workpiece thickness could be calculated by determining the maximum distance of the front of the nose piece 34 from the housing 4 and comparing this to the distance between the housing and the die. Similarly, the closing of air gaps, workpiece mechanical strength, etc, could be analysed by observing the change in speed of the nose piece 34 relative to the housing 4. As another example, one encoder may provide information on the relative positions of the nose piece 34 and the output shaft 6, and another may provide information on the relative positions of the nose piece and the housing 4. In this case, information could be obtained in either manner described above, except that the position and speed of the output shaft 6 relative to the housing 4 would have to be deduced by comparing the relative position and speed of the nose piece 34 relative to both the output shaft and the housing, rather than being read directly by a sensor.

Figure 9:
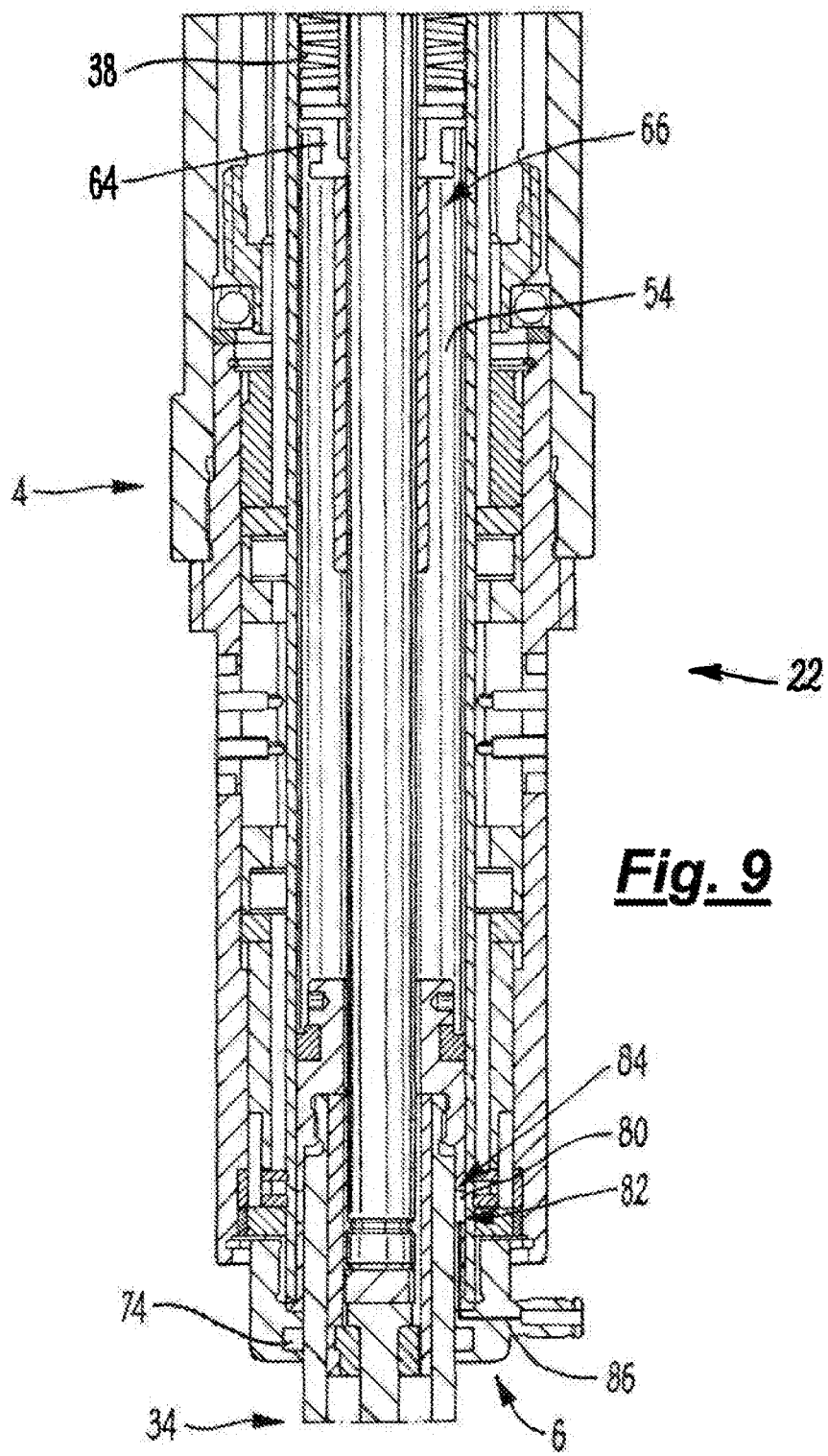
FIG. 9 is a cross-sectional side view of part of a linear actuator assembly according to a modification of the embodiment.

A linear actuator assembly 22 according to a modified embodiment will now be described with reference to FIG. 9. The arrangement of this modification has a chamber 66, as with the embodiment, but also has another chamber 80. This chamber is substantially annular in shape and is positioned substantially circumferentially about the actuator axis. It is co-operatively formed by a cavity 82 in the output shaft and a cavity 84 in the nose piece. Each cavity 82, 84 takes the form of a concave region provided between two annular walls (which in this case are positioned substantially orthogonal to one another). The chamber 80 is connectable to a source of pressurised fluid (not visible) by a duct 86. The chamber 66 which is connectable to a negative pressure device (not visible), and which has a larger volume when the nose piece 34 is in the extended position than when it is in the retracted position, will be referred to below as the suction chamber. The chamber 80 which is connectable to a source of pressurised air, and which has a smaller volume when the nose piece 34 is in the extended position than when it is in the retracted position, will be referred to below as the pressure chamber.

As outlined above, in the embodiment the function of a stripper spring is performed by the gas spring mechanism co-operatively formed by the output shaft 6 and the nose piece 34 (by sealing the duct 61 to the suction chamber 66), and the action of the clamping spring 38 is supplemented by this gas spring mechanism. In this modification, however, a further gas spring mechanism is co-operatively formed by the output shaft 6 and the nose piece 34, using the pressure chamber 80. The action of these two gas spring mechanisms co-operatively perform the function of a stripper spring, and both gas spring mechanisms supplement the clamping spring 38. If the pressure chamber 80 is sealed (for instance by blocking the duct 86), rearward movement of the nose piece 34 relative to the output shaft 6 would increase the axial length of the chamber 80 and thereby increase its volume. This would reduce the pressure in the chamber 80, which in turn would act to urge the nose piece 34 back towards the extended position.

Like the suction chamber 66, the pressure chamber 80 can be utilised to retract the nose piece 34, thereby reducing the axial length of the actuator assembly 22. The duct 86 is connected to source of compressed air (not shown) and by introducing pressurised fluid into the chamber 80, the pressure therein can be increased. This forces the nose piece 34 backwards towards the retracted position. When the chamber 80 is to function as a gas spring again, it can be returned to atmospheric pressure (or any other suitable pressure, such as a lower pressure so that the spring constant of the associated gas spring mechanism is increased).

Although in the embodiment the clamping spring 38 is positioned within the cavity 54, it appears not to be positioned within the suction chamber 66 because it is positioned behind the flange plate 64 (which defines the rear of the chamber). In this modification, however, the flange plate 64 does not comprise a seal (65 in FIG. 6). As such, the chamber 66 can extend further rearwards, and reaches back as far as the second threaded member (10 in FIGS. 4, 7 and 8). As a result, in this arrangement the clamping spring is positioned within the chamber 66. It is also noteworthy that whilst the function of the wiper seal 74 in the previous embodiment is merely to retain lubrication and prevent debris and moisture ingress, in this modified embodiment it may also serve to prevent fluid in the pressure chamber 80 from escaping along the outer perimeter of the nose piece 34.

A linear actuator assembly 22 according to a further modified embodiment will now be described with reference to FIG. 10. In this arrangement, there are no keyways in the main body 12 of the output shaft 6, and no keys in the housing 4. Instead, the anti-rotation feature of the output shaft takes the form of an elongate rod 90 projecting from the first threaded member 8, the anti-rotation feature of the housing takes the form of an aperture 92 in a boss 94 that is positioned behind the drive shaft 50. The rod 90 is of square cross section, and projects axially backwards from the first threaded member 8, through a bore 96 in the drive shaft 50 and through the aperture 92. The boss is fixed to the housing 4 so that it can neither rotate, nor move axially. The aperture 92 has a complementary cross section to that of the rod 90. In this case, the aperture 92 is also square in cross section.

The rod 90 can slide axially within the aperture, but the shape of the aperture 92 prevents the rod from rotating within it. This prevents the first threaded member 8 (and thus the output shaft 6 as a whole) from rotating relative to the boss 94 (and thus the housing 4). The bore 96 in the drive shaft 50 is of sufficient diameter to prevent the drive shaft touching the rod 90. Rotation of the drive shaft 50 is therefore unimpeded.

Figure 10:
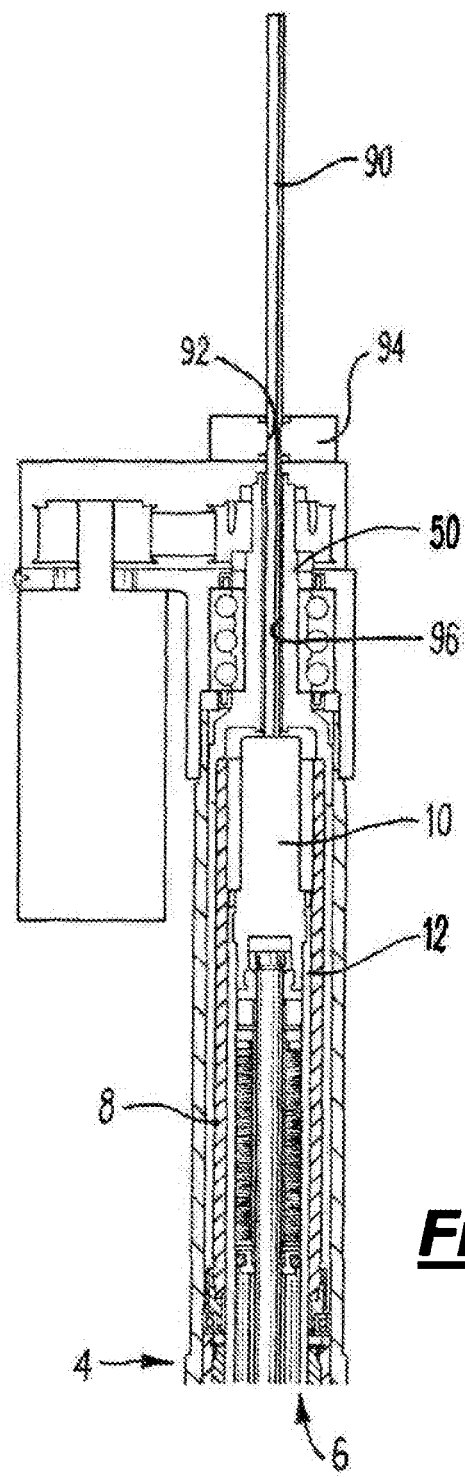
FIG. 10 is a cross-sectional side view of the rear of a linear actuator according to another modification of the embodiment.

FIG. 10 shows the output shaft 6 in the retracted position. The rod 90 is of sufficient length that with the output shaft in the extended position the rod remains received within the aperture 92. While this modification increases the overall length of the actuator assembly, it allows the main body of the output shaft to be circular in external cross section. This may increase the resistance to bending of the main body 12 (and thus of the output shaft 6 as a whole) and/or ease of sealing, as described above, and/or make the main body easier to manufacture.

In this modification, unlike the previous embodiment, the anti-rotation features (namely the rod 90) do not axially overlap with the threads of the first threaded member 8 when the output shaft 6 is in the retracted position. However, when the output shaft 6 moves forwards, towards the extended position, the rod then reaches a position where it does axially overlap with the threads of the first threaded member. With the output shaft 6 in the extended position, the rod 90 (i.e. the anti-rotation feature of the output shaft) axially overlaps the threads of the first threaded member 8 by around 70% of their total axial length. It is also noteworthy that in this modification, regardless of its position relative to the housing 4, the output shaft 6 remains received within the threads of the first threaded member 8 to a depth of 100% of their axial length.

Although in this example the rod and aperture are each of square cross-section, in other arrangements they may be any other suitable shape. For instance, the rod or aperture may be triangular, hexagonal, octagonal or elliptical. Further, the cross sectional shape of the aperture may be complementary to the cross sectional shape of the rod without being the same shape. For example, the rod may be octagonal and the recess square, or the rod may be triangular in cross section and the recess may be in the shape of a six-pointed star. Further, other embodiments may utilise two or more separate rods received in correspondingly positioned recesses (i.e. engaging in a manner akin to a spanner head screwdriver).

It will be appreciated that numerous modifications to the above described design may be made without departing from the scope of the invention as defined by the appended claims. For instance, though the invention has been described herein in relation to actuator assemblies for SPR, it may equally be used in any other suitable application, such as in other types of joining operations (such as clinching, blind riveting, applying self-piercing studs, or friction stir spot welding), or in actuators for robotic manipulation of components. In addition, although the invention has been described in relation to a motor-driven actuator in which an electric motor operates a roller screw mechanism, the invention may equally be used in relation to any other suitable type of actuator. For instance, it may be used in relation to an actuator which uses a hydraulic or pneumatic motor, and/or one which utilises a lead screw mechanism or a ball screw mechanism. Further, the first aspect of the invention may be used with an actuator other than a motor-driven actuator, such as a hydraulic cylinder. Similarly, the third or fourth aspects of the invention may be used with actuators which use a conventional stripper spring, a conventional gas spring (i.e. one which is not connected to a negative pressure device), or neither (at which point the nose piece may be urged to the extended position by its own weight).

Although the described embodiment utilises a clamping spring this may not be present in other embodiments, since clamping is not a requisite for SPR in all circumstances, and other applications for an actuator assembly according to the invention may not require such a spring. Further, although the actuator assemblies described have a punch for driving a rivet towards a die, in other embodiments the output shaft may drive a die towards a punch and rivet.

Although the above description gives examples of extended and retracted positions of an output shaft and nose piece, these should not be construed as limiting. In other embodiments the output shaft and/or nose piece (where present) may be movable to a position beyond the extended position and/or a position beyond the retracted position.

Whilst clamping has been described as taking place during insertion of a rivet, depending on the application in question clamping may begin before rivet penetration (e.g. to assist in the spread of adhesive between workpiece layers) or after rivet penetration has begun, and/or clamping may end before penetration is complete. In addition, it should be noted that clamping may be used in other fields beyond SPR, for instance during clinching or friction stir welding operations.

In other embodiments, the force transfer sleeve, where present, may take any other suitable form. For instance, it may be a strut, beam or framework. Further, although the clamping spring of the embodiment is in the cavity of the output shaft, it may instead be in the cavity of the nose piece, or outside the chamber (where present) altogether.

Although the tool nose has been described as being part of the nose piece, it may equally be considered to be a separate component. Similarly, the plunger may be considered to form part of the output shaft.

The described and illustrated embodiments are to be considered as illustrative and not restrictive in character, it being understood that only preferred embodiments have been shown and described and that all changes and modifications that come within the scope of the invention as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims. The optional and/or preferred features for each aspect of the invention are also applicable to any other aspects of the invention where appropriate. Further, in arrangements according to the invention any feature described in relation to a suction chamber may be present in relation to a pressure chamber (whether or not the suction chamber has that feature, and indeed whether or not the arrangement in question has a suction chamber at all), and vice versa. For instance, in an embodiment of the invention comprising a pressure chamber a clamping spring may be provided in the pressure chamber (whether or not that embodiment has a clamping spring in a suction chamber, and indeed whether or not that embodiment has a suction chamber at all). By way of example, a modification of the arrangement of FIG. 9 may include a clamping spring in the form of a tension coil spring. Rearward movement of the nose piece relative to the output shaft would not only increase the axial length of the pressure chamber, but would also stretch the tension coil spring. The tension coil spring would thus provide (at least part of) the clamping force.

The invention claimed is:

1. A linear actuator assembly comprising:
   a housing;
   an output shaft which defines an actuator assembly axis, the output shaft being movable along the actuator assembly axis between an extended position and a retracted position relative to the housing;
   a nose piece which is slidably mounted to the output shaft and movable between an extended position and a retracted position relative to the output shaft; and
   a negative pressure device,
   wherein:
   the nose piece and the output shaft co-operatively define a chamber for containing a quantity of fluid, the volume of the chamber being smaller when the nose piece is in the retracted position than when the nose piece is in the extended position;
   the negative pressure device is connectable to the chamber; and
   the negative pressure device is selectively operable so as to reduce the pressure in the chamber, thereby urging the nose piece from the extended position towards the retracted position.

2. The linear actuator assembly according to claim 1 wherein:
   the nose piece and the output shaft also co-operatively define an additional chamber for containing a quantity of fluid, the volume of this additional chamber being larger when the nose piece is in the retracted position than when the nose piece is in the extended position; and
   the additional chamber is connectable to a source of pressurised fluid, and is arranged whereby introduction of fluid from said source increases the volume of the additional chamber, thereby urging the nose piece from the extended position towards the retracted position.

3. The linear actuator assembly according to claim 2 wherein the chambers can be selectively sealed, thereby allowing the nose piece and output shaft to co-operatively form a gas spring mechanism.

4. The linear actuator assembly according to claim 1 wherein the negative pressure device is connectable to said chamber through the nose piece.

5. The linear actuator assembly according to claim 1 wherein the nose piece comprises a cavity which defines part of the chamber.

6. The linear actuator assembly according to claim 1 wherein the output shaft comprises a cavity which defines part of the chamber.

7. The linear actuator assembly according to claim 6 wherein the nose piece is slidably received within the cavity of the output shaft.

8. The linear actuator assembly according to claim 1 further comprising a plunger which is connected to the output shaft and projects into an aperture in the nose piece.

9. The linear actuator assembly according to claim 1 further comprising a resilient element positioned to urge the nose piece from the retracted position towards the extended position.

10. The linear actuator assembly according to claim 9 wherein the resilient element is positioned within the chamber.

11. The linear actuator assembly according to claim 1 wherein:
   the linear actuator assembly further comprises a motor configured to rotate a first threaded member relative to the housing;
   the output shaft comprises a second threaded member; and the threads of the first and second threaded members are arranged to directly or indirectly act on each other to convert rotation of the first threaded member relative to the second threaded member into linear motion of the second threaded member, thereby moving the output shaft between the extended and retracted positions.

12. The linear actuator assembly according to claim 11 wherein the output shaft and the housing are provided with mutually complementary anti-rotation features configured to restrict relative rotation of the output shaft and the housing throughout normal use.

13. The linear actuator assembly according to claim 12 wherein the output shaft is movable to a position in which it is at least partially received within the first threaded member.

14. The linear actuator assembly according to claim 12 wherein the output shaft is movable to a position in which the anti-rotation feature of the output shaft axially overlaps with the threads of the first threaded member.

\* \* \* \* \*